United States Patent [19]

Schlaeger

[11] Patent Number: 5,743,689
[45] Date of Patent: Apr. 28, 1998

[54] AUTOMOBILE LOADING WEDGE AND METHOD

[76] Inventor: Gary D. Schlaeger, 3321 Springfield Rd., Springtown, Tex. 76082-6136

[21] Appl. No.: 603,650

[22] Filed: Feb. 20, 1996

[51] Int. Cl.[6] .................................................. B60P 7/08
[52] U.S. Cl. .......................... 410/30; 410/13; 410/19; 410/155; 188/32
[58] Field of Search ............................ 410/4, 6, 7, 9, 410/13, 16, 19, 25, 30, 49, 155; D12/217; 188/32, 4 R; 254/88; 280/79.4

[56] References Cited

U.S. PATENT DOCUMENTS

| 1,448,250 | 3/1923 | Au-Miller | 254/88 |
| 1,776,935 | 9/1930 | Snyder | 410/30 |
| 1,923,382 | 8/1933 | Leet | 410/13 |
| 1,971,402 | 8/1934 | Goss | 188/32 X |
| 3,289,794 | 12/1966 | Miles | 188/32 X |
| 3,985,242 | 10/1976 | Schlaeger | 410/121 |
| 4,305,508 | 12/1981 | Rodgers | 410/49 X |
| 4,310,271 | 1/1982 | Canellis et al. | 410/13 |
| 4,371,298 | 2/1983 | Van Iperen | 410/25 |
| 4,641,994 | 2/1987 | Hankison | 188/32 X |
| 5,332,066 | 7/1994 | Pickeral | 188/32 |

FOREIGN PATENT DOCUMENTS

| 610513 | 10/1960 | Italy | 188/32 |
| 92/06012 | 4/1992 | WIPO | 410/49 |

Primary Examiner—Stephen Gordon
Attorney, Agent, or Firm—Arthur F. Zobal

[57] ABSTRACT

Two light weight, movable ramp members having upper depressions are provided for supporting a pair of wheels of a motor vehicle in an elevated position in a transport container. The two ramp members are spaced apart with two spacers to hold them against the side walls of the container. At least three pairs of the ramp members may be provided to support the front or rear wheels of three vehicles. Spacers are provided for spacing the front pair of ramp members from the front wall of the container. The two ramp members may be used to support the front or rear wheels of a motor vehicle in a container by locating the two members on the floor of the container; using the spacers to maintain them at desired positions; and moving the front or rear wheels of the motor vehicle up the two ramp members into their upper depressions.

8 Claims, 10 Drawing Sheets

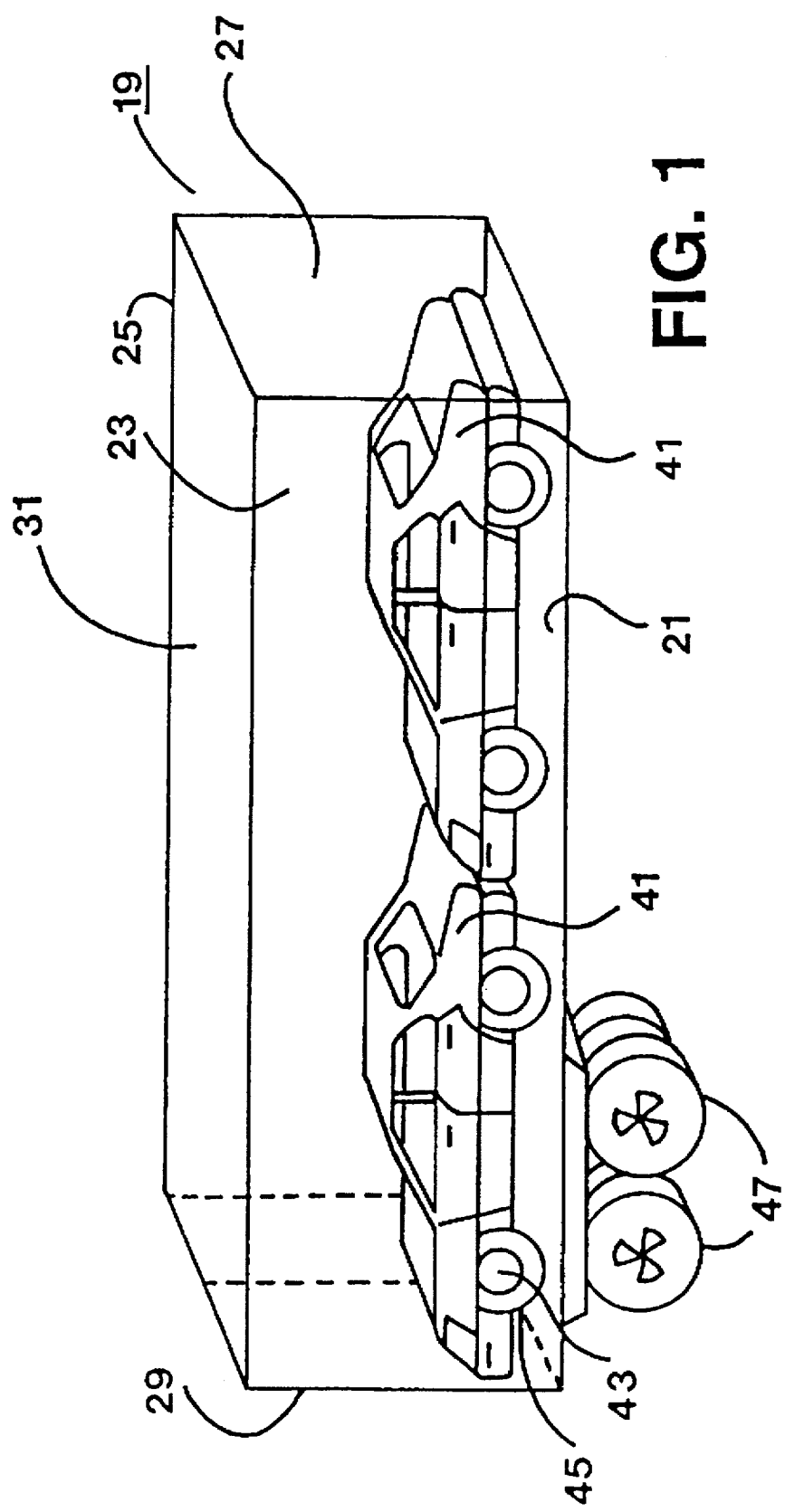

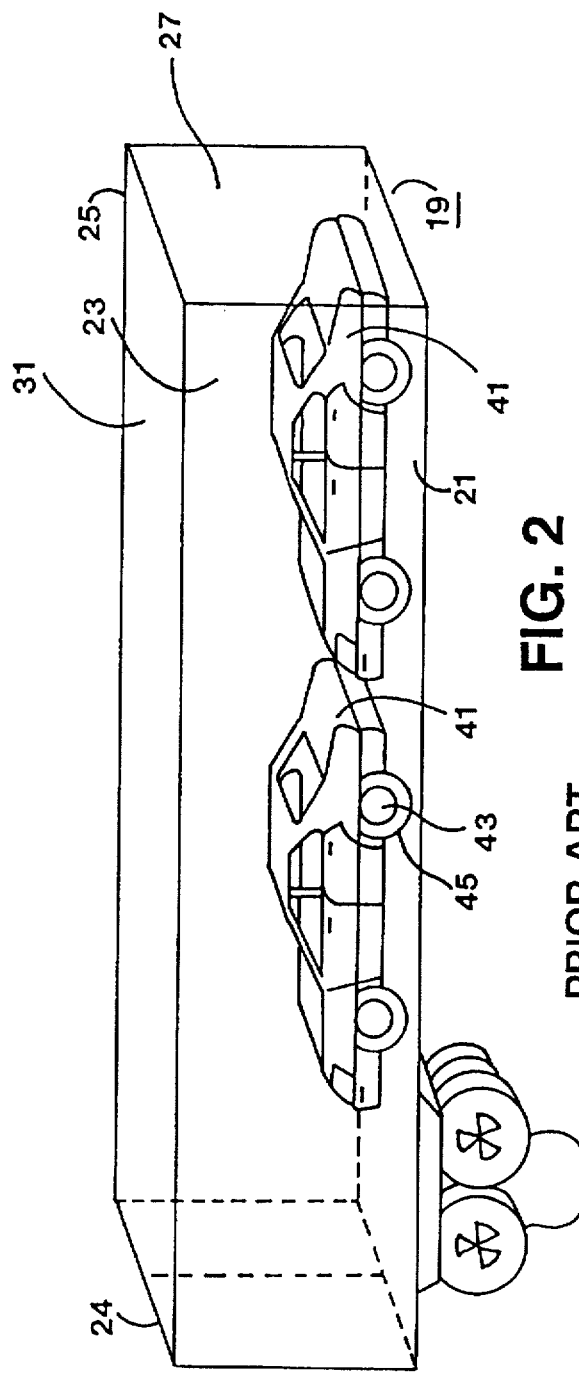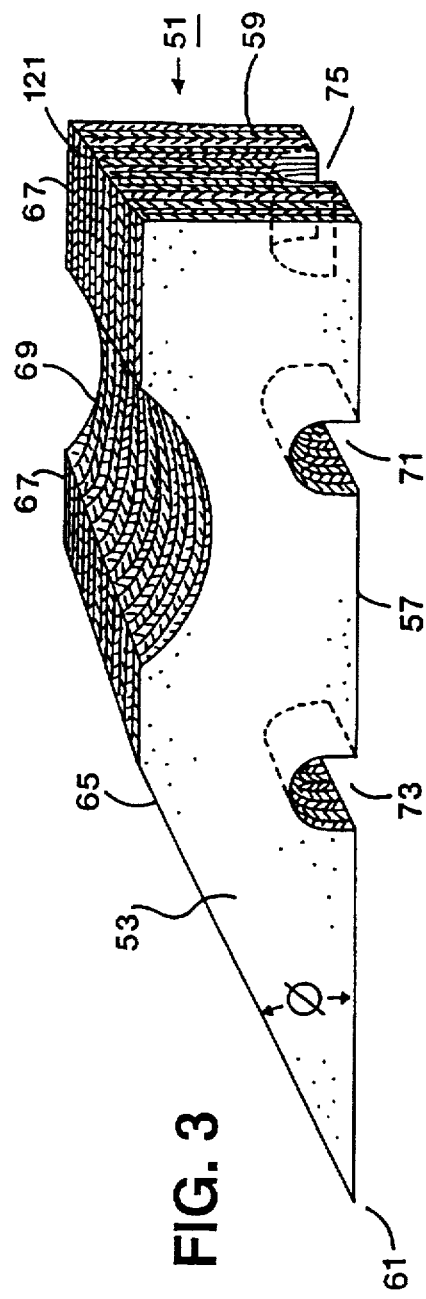

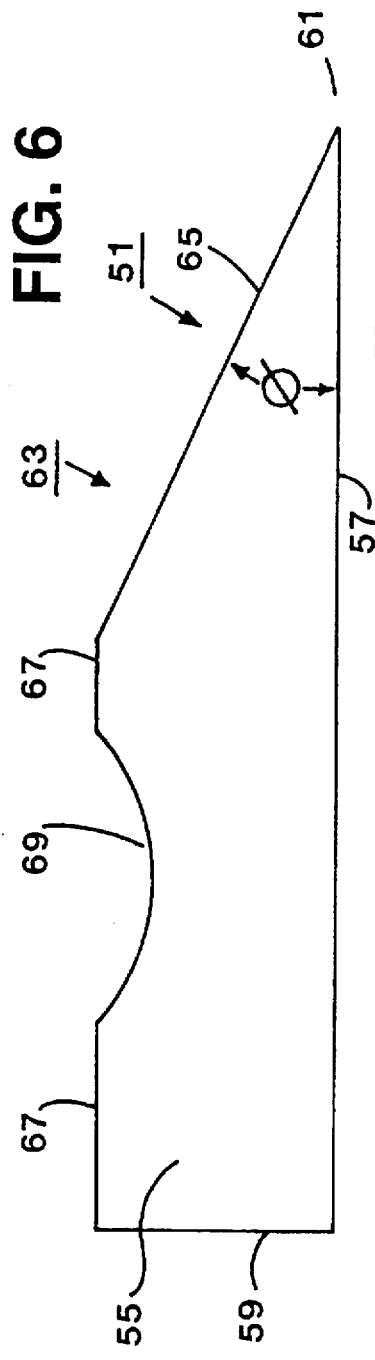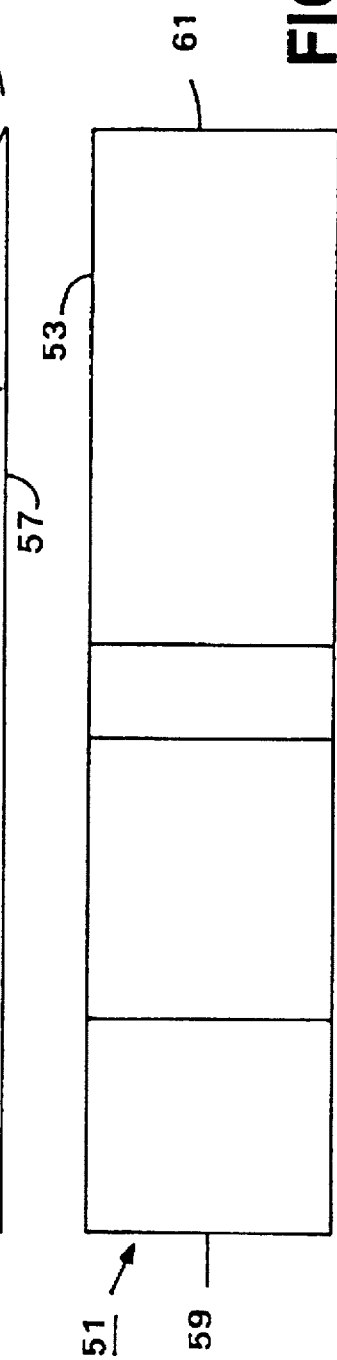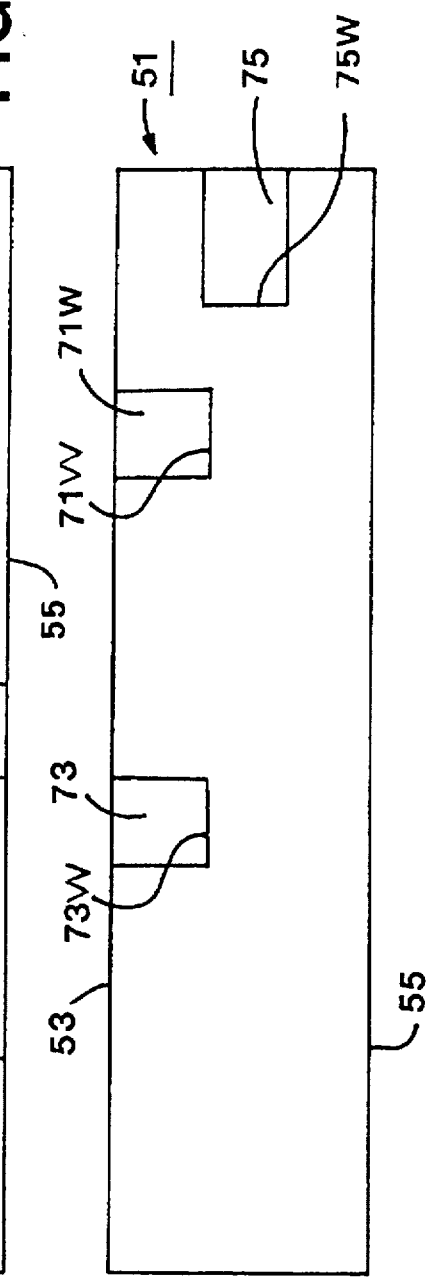

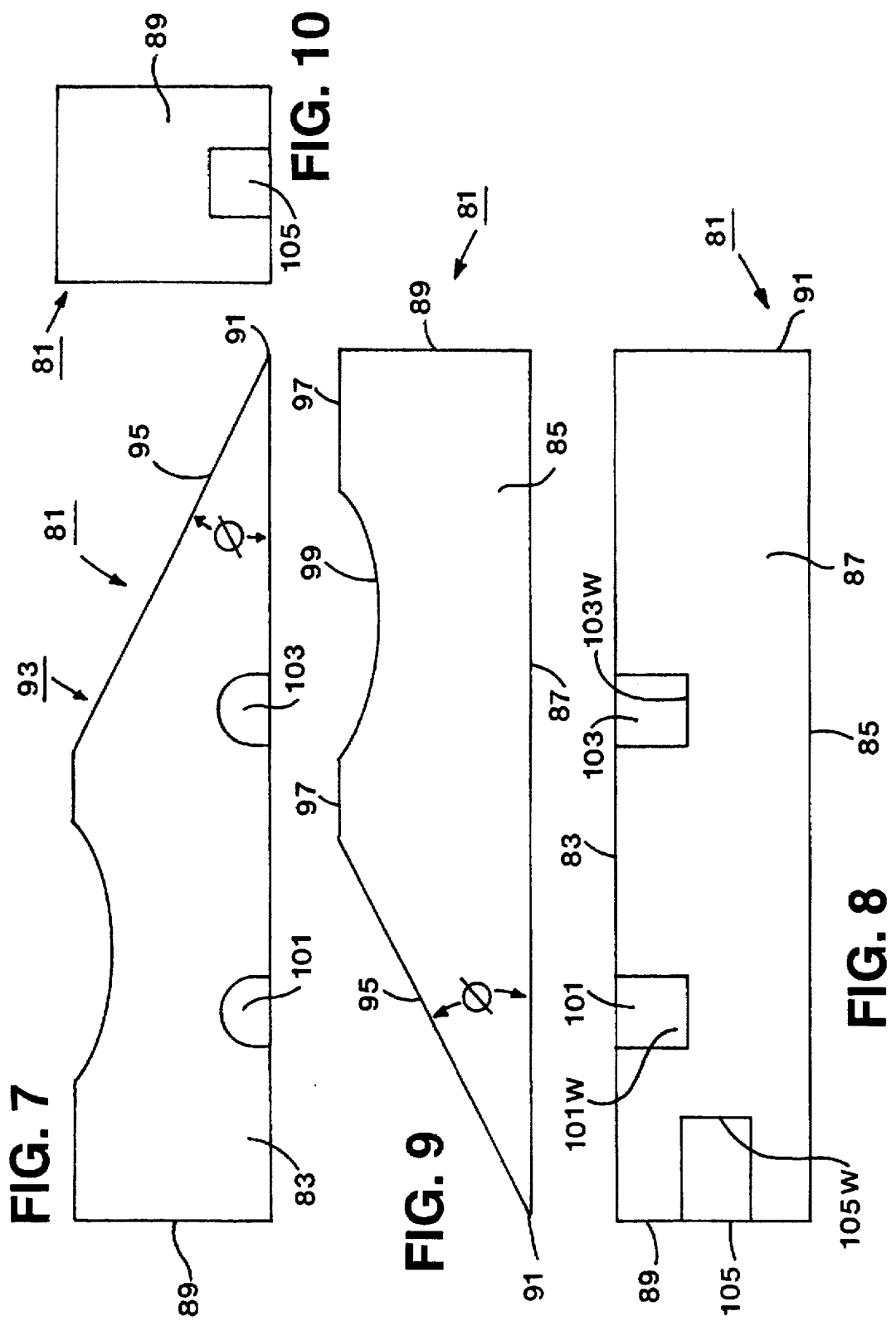

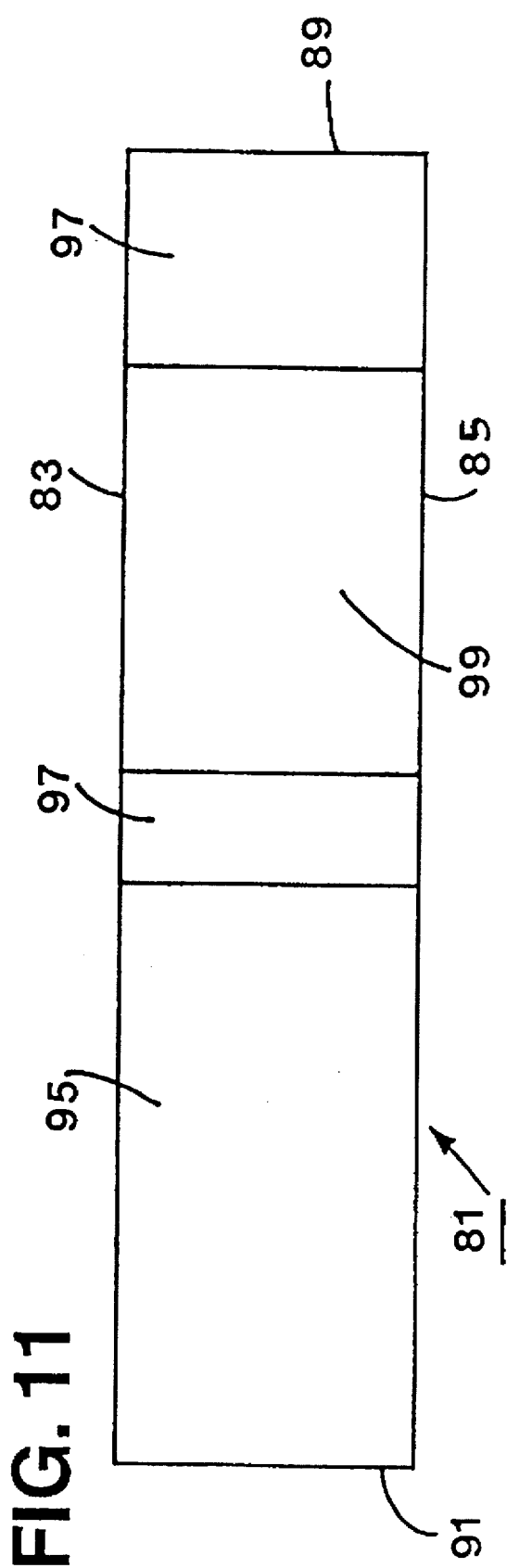
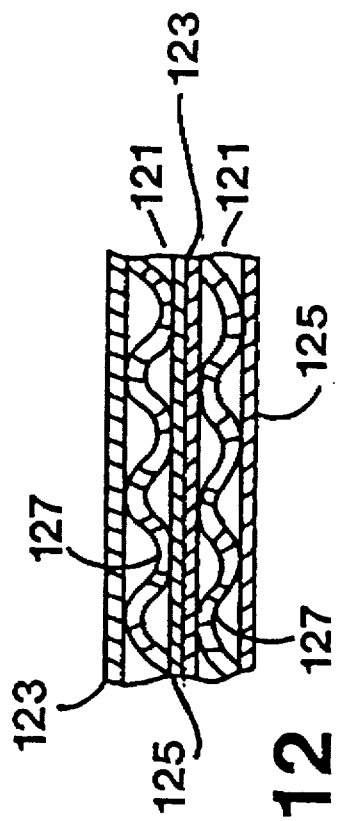
FIG. 11
FIG. 12

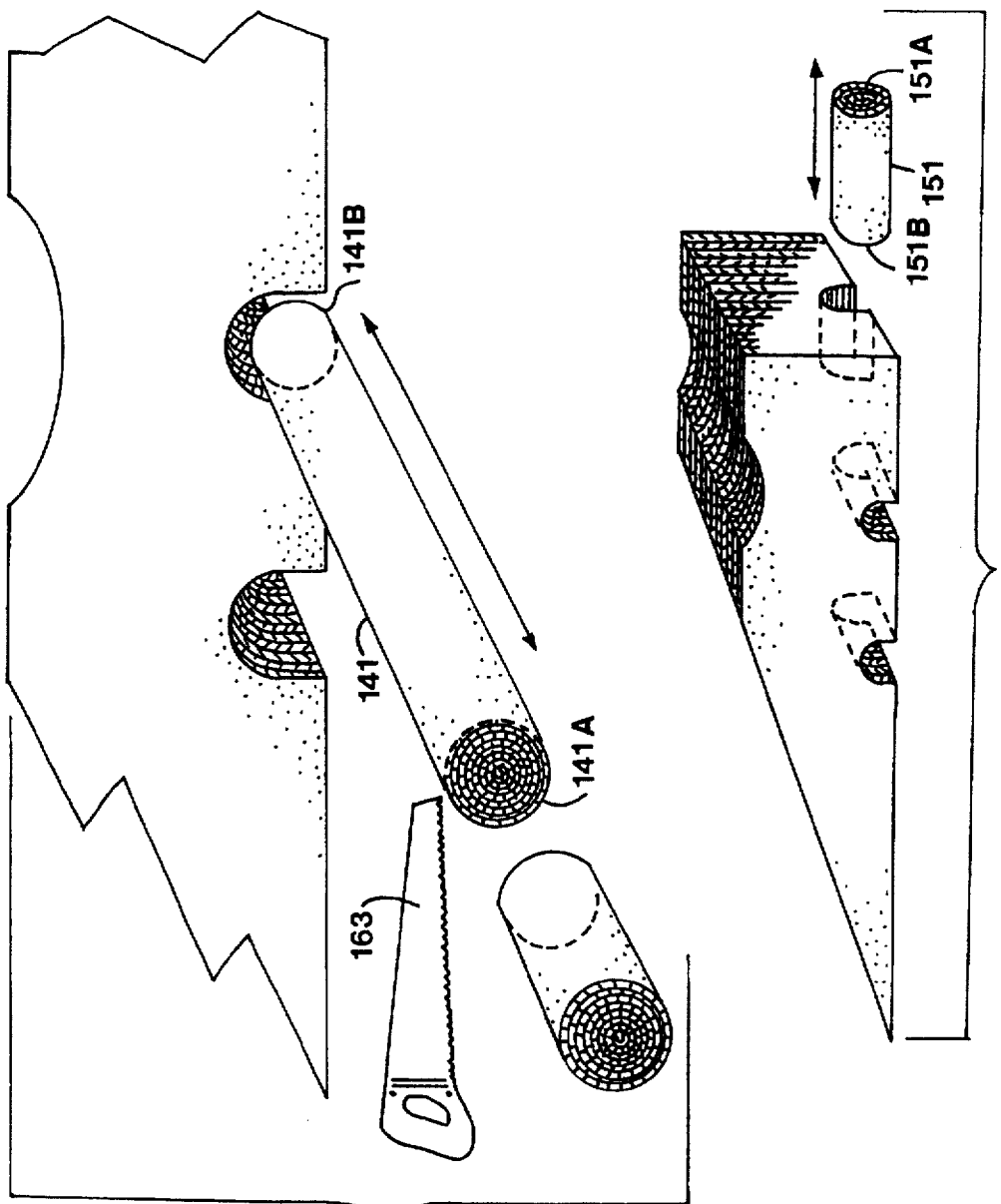

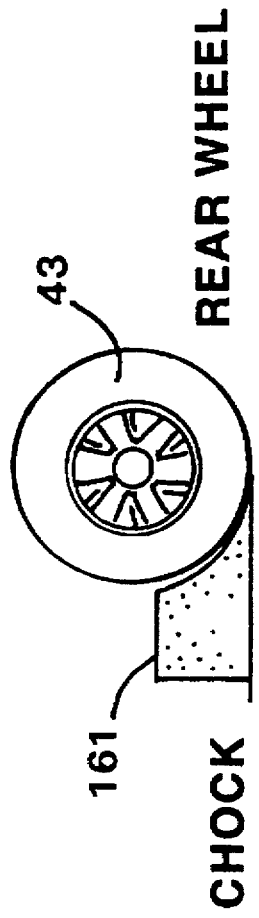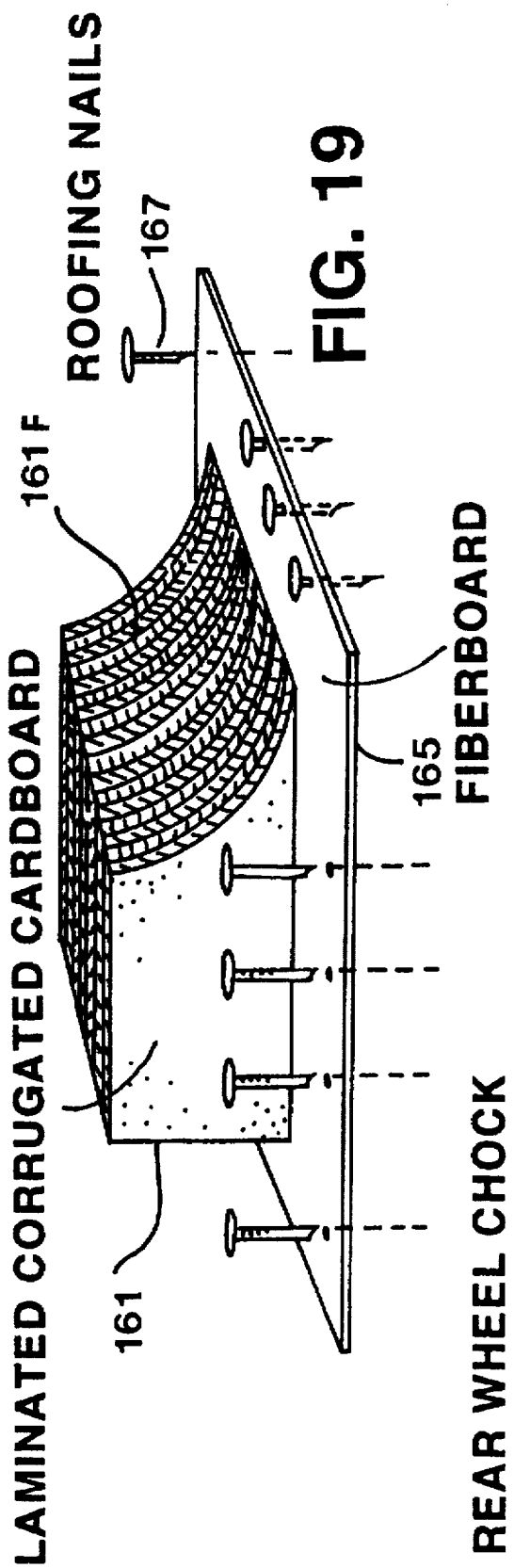

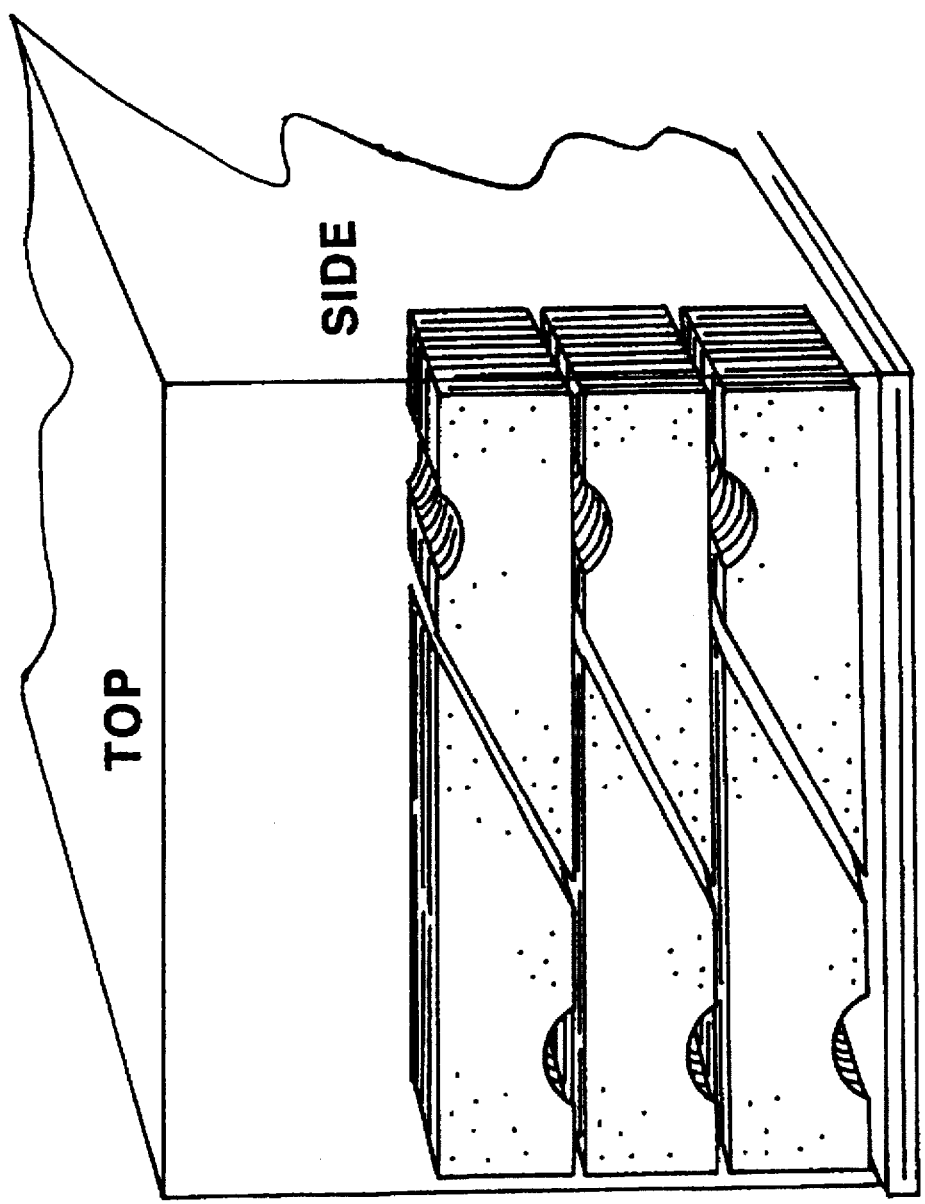

5,743,689

AUTOMOBILE LOADING WEDGE AND METHOD

BACKGROUND OF THE INVENTION

1. Field of the Invention

The invention relates to an apparatus for supporting motor vehicles in a container for transportation purposes.

2. Description of the Prior Art

Intermodal Transportation is the practice by which freight is transported in vehicles, vans, semi-trailers or intermodal containers which are capable of being moved intermodally by surface carriers on highways, railroads or waterborne vessels of various types and configurations, generally in closed containers ranging in cross sectional area of up to ten (10) feet by ten (10) feet and lengths up to fifty-four (54) feet. These closed containers are designed to handle general freight either unitized, or, in bulk; and, are not generally equipped to handle automobiles efficiently.

It is desirable to transport automobiles in closed containers. Automobiles are valuable freight commanding high freight rates. Automobiles are more subject to damage and pilferage when moved on open vehicles. It is more desirable, and economical to move automobiles in closed vehicles. A fundamental goal for utilization of transportation equipment is to keep it loaded as much as possible in a manner with freight which generates profitable revenues. An inherent problem with "general purpose" containers is they are designed to handle many various types of freight commodities acceptably, but often are not as well suited or efficient as equipment specially designed to handle a specific type of freight. The problem with specially designed freight equipment such as automotive trailers is that they are limited to hauling only automobiles and not general cargo. They usually cannot be used intermodally to provide continuous "seamless" service between modes such as "over-the-road" for transload or interchange with a railroad or water carrier. Thus specialized equipment and their "market niches" and opportunities for longer hauls, and return hauls with a variety of different commodities and cargos are limited. In addition to being limited to forward (head) hauls specialized automobile trailers are restricted somewhat in winning return (back) hauls for a wider variety of freight than a closed "general cargo" container can achieve. This reduced capability of back haul and head haul, together with the high capital cost of special equipment, results in the cost of hauling automobiles over great distances in specialized equipment becoming more costly and limited.

If automobiles can be loaded efficiently into and effectively use the available space in closed general cargo containers such as highway vans, semi-trailers, or international containers, then additional higher value intermodal freight revenues can be generated, empty return ratios minimized, and, existing transportation capacity utilized more efficiently without the capital or necessity for less efficient specialized expensive freight equipment with the prospect for handling a greater variety of general cargo in opposite directions.

To date various complex mechanical and robotics systems have been developed for loading and unloading automobiles into containers or semi-trailers. They are complex and very expensive to manufacture; very complex to maintain, operate, assemble, or, disassemble when used to convert a general cargo container semi or trailer reusable for general cargo once automobiles have been unloaded. These complex cargo systems require special storage areas in the vehicle and are costly to assemble, and disassemble. Any breakdown of a working part of a complex mechanical loading device while in transit can disable the entire device and prevent the accompanying container or van from being used for subsequent auto loading until the part is replaced or repaired.

PRIOR LOADING PROCEDURE FOR GENERAL PURPOSE CONTAINER

Referring to FIG. 1 there is illustrated a general purpose container 19 having a floor 21, two opposite side walls 23 and 25, a front wall 27, a rear door assembly 29 and a top wall 31. Two conventional automobiles 41 each having four wheels (tires) 43 with tires 45 are shown supported on the floor by their wheels. The container has rear wheels 47 such that it may be pulled on the road by a track (not shown) attached to the front end. The inside dimensions of the container are a width of 8 feet, a height of 8 feet, and a length of 40 feet. FIG. 2 is a view similar to that of FIG. 1 but with an inside container length of 54 feet. The inside width and height each is 8 feet. Only two medium size automobiles can be carried by the container of FIG. 2 when their wheels are supported on the floor.

Two automobiles not exceeding a cross sectional area of 8 feet by 8 feet or a length of twenty (20) feet can be loaded by simply driving the autos into the container of FIG. 1. Since most general cargo highway vans and containers range in length over forty (40) feet, it is apparent that only two (2) vehicles could ordinarily be loaded into a container exceeding forty (40) feet inside but not greater than fifty-four (54) feet (see FIG. 2) with all four wheels of the automobiles on the floor of the container. This ordinarily allows shipment of two (2) automobiles with substantial void space. To keep the automobiles from moving dependently within the container or van requires "blocking and bracing" with non-reusable dunnage at a substantial expense. This dunnage would have to be acquired at origin by the shipper and disposed in an environmentally acceptable manner at destination by the receiver at significant respective costs for shippers and receivers.

SUMMARY OF THE INVENTION

It is an object of the invention to provide a low cost dunnage wedge apparatus to render a general cargo container capable of loading and unloading automobiles which is simple, requires no maintenance and is not costly if damaged or lost and requires little training to operate. It can be rapidly disassembled and stored in a semi-trailer, van or container in a safe and compact manner that allows it to accompany a future load of general cargo until it is unloaded. Then the auto unloading embodiment can be deployed for subsequent loading of automobiles.

By use of a reusable dunnage device of the invention provided by the carrier as a part of the van, three automobiles instead of two could alternately be juxtapositioned in the container or semi-trailer in such a manner which would prevent movement in transit and prevent damage. Three cars instead of two could then be transported in the trailer or container with no cost of dunnage incurred by either shipper or receiver. The invention will minimize damage and not require a shipper to procure; or, for a receiver to dispose of any dunnage. It will keep capital investment and operating costs to a minimum for the carrier. It is expected that the invention will improve the equipment utilization by over fifty percent.

I have modified and improved upon my earlier patent dunnage filler device of U.S. Pat. No. 3,985,242, with a new apparatus for filling voids in box cars so as to render a preferred embodiment which can be efficiently used to safely transport and load automobiles into highway vans, semi-trailers; and/or containers more efficiently, fill their occupied space and be more fully used, alternately stored, and used as a dunnage filler in these transportation vehicles and containers not otherwise possible.

I have devised a reusable dunnage device comprised of a light weight, very strong composite which is convenient and reusable. The preferred embodiment is capable of sustaining partial damage without becoming useless and yet inexpensive and economical enough to dispose of in an environmentally acceptable manner if only one trip is desired. It is constructed of readily available material which is recyclable and soft enough to not damage the automobiles or general cargo if exposed to damage and resilient within the container and or impact during transit.

This is accomplished by providing appropriately spaced parallel pairs of strong lightweight specially designed ramp-like wedge members which will allow an automobile to be loaded to drive up on this temporary removable ramp so that one set of wheels on the automobile will be elevated above the floor to juxtaposition the automobile in an appropriate acute angle that positions one end of the auto toward the top of the container.

The invention allows three automobiles to be loaded into a container ranging from eight (8) feet wide by eight (8) feet high to ten (10) feet wide by ten (10) feet high and in container lengths ranging from forty (40) feet to fifty-four (54) feet. The invention also allows three automobiles of different lengths and widths depending on make and model to be loaded into a container. If wedged-shaped dunnage ramps are to be used for a variety of containers and automobile sizes they must be capable of being rigidly positioned either forward or backward in a manner that can be rendered immobile or incapable of moving away from the side walls of the container or a predetermined distance from the front or rear of the container so that the automobiles or wedge ramps will not move in transit.

This is accomplished in one embodiment by a composite cylindrical member or "corrugated log" which can be easily cut to length using conventional tools and inserted in circular notched receptacles in the planar sides of the wedge-shaped ramps and juxtapositioned between parallel pairs of ramps which will retain the wedge ramps in place within the containers.

The first loading pair of ramp wedges is placed in the container, spaced properly; and the first car driven upon them and positioned. Then, the forward part of second pair of parallel oriented wedges is positioned up against the rear bumper of the first car and wedge-shaped angle or "chocks" are positioned behind the rear wheels of the first auto and affixed to the floor of the container or van to keep the forward car from rolling backwards off the wedge-shaped ramp during transit (see FIG. 19). A cutout semi-circular depression has been devised in the top plane of the wedge shaped ramp to accommodate a variety of tire sizes on the automobiles to hold them in rest during transit.

The wedges and wheel depressions of the invention allow the automobiles to be elevated just enough to prevent them from touching the roof of the container or semi-trailer as well as separating one automobile from the other. The wedges are wide enough to come inboard from various inside widths between the side walls of various containers to support the various widths of wheels and axles from the automobiles driven on them. The wedges have a preferred acute angle of repose to allow automobiles of different lengths and widths to be driven upon on them and not have the vehicle's bottom touch the wedge ramp when the lading wheels come to rest in the semi-circular depressions in the center on the top of the ramp pairs, yet are high enough to allow the front planar portion of the wedge shaped ramps to rest firmly against the rear bumper of the car in front of it when positioned.

The wedges of the invention are economic, strong, and lightweight, such that they can easily be lifted by one man and stored into the front of the container or semi-trailer efficiently when not in use.

BRIEF DESCRIPTION OF THE DRAWINGS

FIGS. 1 and 2 illustrates two automobiles loaded into containers of different lengths with their tires supported on the bottom floor of the containers.

FIG. 3 is an isometric view of one wedge shaped ramp of the invention showing the fight side.

FIG. 4 is a bottom plan view of the ramp of FIG. 3 with the laminated layers not shown.

FIG. 5 is a top view of the ramp of FIG. 3 with the laminated layers not shown.

FIG. 6 is a left side elevation view of the ramp of FIG. 3.

FIG. 7 is a left side elevation view of the other ramp of the invention.

FIG. 8 is a bottom plan view of the ramp of FIG. 7 with the laminated layers not shown.

FIG. 9 is a right side elevation view of the ramp of FIG. 7.

FIG. 10 is a front view of the ramp of FIG. 7 with the laminated layers not shown.

FIG. 11 is a top plan view of the ramp of FIG. 7.

FIG. 12 is a cross-section of a portion of one of the ramps.

FIG. 16 illustrates a front spacer member being inserted into the front hole of a ramp of the invention.

FIG. 17 illustrates a spacer member being formed and being inserted into one of the side holes of a ramp of the invention.

FIG. 19 is an isometric view of a rear wheel chock of the invention.

FIG. 20 shows the chock of FIG. 19 holding a rear wheel of a motor vehicle.

FIG. 21 illustrates the six ramps of FIG. 13 stacked for storage purposes in the front end of a container.

DESCRIPTION OF THE PREFERRED EMBODIMENTS

Figure 14:
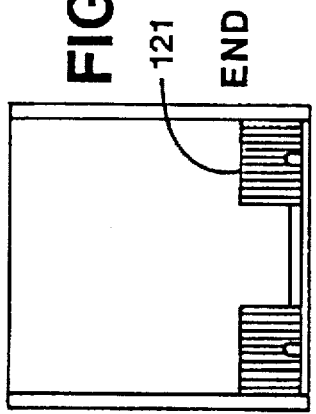
FIG. 14 is a front view of a container showing the front ends of the front ramps of FIG. 13.
Figure 13:
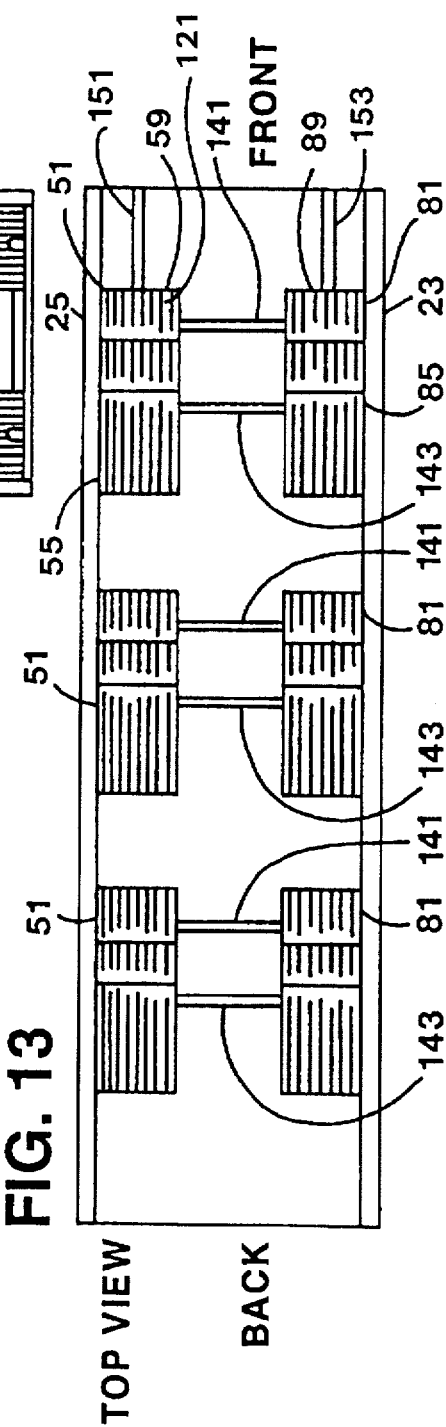
FIG. 13 is a top plan view of three pairs of ramps supported on the floor of a container.

Referring to FIGS. 3–17 the wedge shaped ramps 51 and 81 of the invention for allowing storage of at least 3 automobiles in a conventional length container will be described. Ramp 51 has two opposite sides 53 and 55, a bottom surface 57, front and rear ends 59 and 61 and a top surface 63. The top surface comprises a slanted portion 65 forming an acute angle theta relative to the bottom surface 57 and which leads to an upper surface 67 which is parallel with the bottom surface 57. A rounded slot 69 is formed in surface 67 near the front end 59. The right side 53 has two slots or apertures 71 and 73 formed therein at the bottom which extends inward a short distance to walls 71W and 73W respectively. The slots 71 and 73 are shown rounded however they could have three straight sides. The front end 59 has a slot or aperture 75 formed therein at the bottom which extends inward a short distance to wall 75W. The slot 75 is shown having a rounded side however it could have three straight sides. Ramp 81 has two opposite sides 83 and 85, a bottom surface 87, front and rear ends 89 and 91 and a top surface 93. The top surface comprises a slanted portion 95 forming an acute angle theta relative to the bottom surface 87 and which leads to an upper surface 97 which is parallel with the bottom surface 87. A rounded slot 99 is formed in surface 97 near the front end 89. The left side 83 has two slots or apertures 101 and 103 formed therein at the bottom which extends inward a short distance to walls 101W and 103W. The slots 101 and 103 are shown rounded however they could have three straight sides. The front end 89 has a slot or aperture 105 formed therein which extends inward a short distance to wall 105W. The side of the slot 105 is shown having three straight sides however it could have a rounded side. The ramps 51 and 81 preferably are formed of laminated layers 121 of corrugated cardboard with the layers extending along the length of the ramps between their front and rear ends as shown in FIGS. 3, 13, and 14. Two such layers 121 are shown in cross-section in FIG. 12. Each layer comprises two outer sheets 123 and 125 of paper with a central sheet 127 of paper in wave form bonded or glued to the insides of sheets 123 and 125. Adjacent sheets 125 and 123 are bonded or glued together.

The ramps also may be formed of fiberglass or rigid foam such as closed cell urethane or high density poly ethelene foam.

Also provided are two pairs of spacers 141 and 143 for each pair of ramps 51 and 81 for holding the two ramps 51 and 81 apart. In addition, two spacers 151 and 153 are provided for the front pair of ramps 51 and 81 for holding them spaced from the front wall of a transporting container. All of the spacers 141, 143, 151 and 153 have opposite ends adapted to fit into any of the slots 71, 73, 75, 101, 103, and 105. The spacers 141 and 143 may be identical. Spacer 141 is shown in FIG. 17 and has two opposite ends 141A and 141B. Spacers 151 and 153 may be identical. Spacer 151 is shown in FIG. 18 and has opposite ends 151A and 151B.

For loading three automobiles in a container, three pairs of ramps 51 and 81 are provided. Also provided are three pairs of spacers 141 and 143 and one pair of spacers 151 and 153. In addition three pairs of rear wheel chocks 161 are provided. One type of chock which may be used is shown at 161 in FIGS. 19 and 20.

Figure 15:
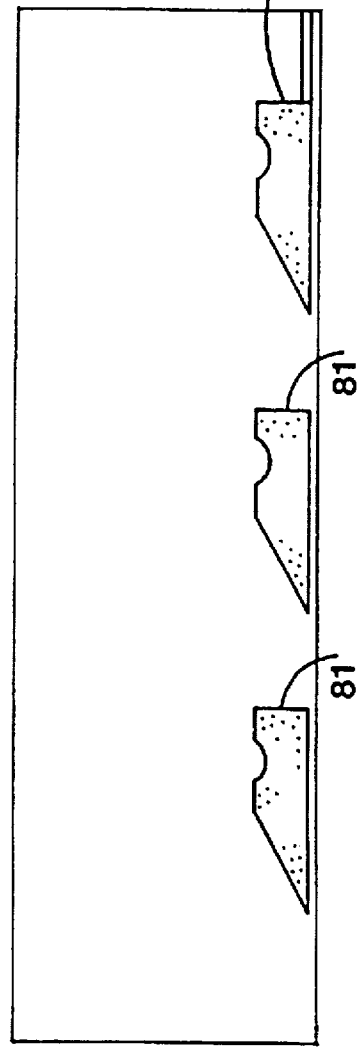
FIG. 15 is a side view of the ramps of FIG. 13.

Referring to FIGS. 13, 14, and 15, there will be described the manner in which the invention is used to load three automobiles in a container 19. A first pair of ramps 51 and 81 are located in the front of the container 19 with their front ends 59 and 89 facing forward and their sides 55 and 85 against the side walls 25 and 23 of the container. The spacers 141 and 143 are fitted into the apertures 71, 101, and 73, 103 such that their ends abut against the inward walls 71W, 101W and 73W, 103W to hold the ramps 51 and 81 apart and against the side walls 25 and 23 of the container 19. The spacers 151 and 153 are inserted into the front apertures 75 and 105 such that two of their ends abut against the inward walls 75W and 105W and two of their ends abut against the front wall 27. The first automobile 41 is driven into the container and up on the front pair of ramps coming to rest with the tires of its front wheels in the receptacles or slots 69 and 99. The chocks or stops 161 are positioned behind the rear wheels of the first automobile and affixed to the floor of the container to prevent the forward automobile from rolling backward off of the ramps during transit. The second pair of ramps 51 and 81 then are placed on the floor of the container; the spacers 141 and 143 are inserted in the apertures 71, 101 and 73, 103 to hold the ramps apart and against the side walls of the container and the front ends of the ramps are abutted against the rear bumper of the first automobile. The second car is driven on the second pair of ramps to locate its front wheels in the receptacle 69 and 99. Chocks 161 are positioned against the rear wheels of the second car and secured to the floor. and the third pair of ramps are placed in the container, held apart by the spacers 141 and 143 as previously described and their front end moved against the bumper of the second car. The third car is driven on the third pair of ramps with their front wheels located in the receptacles 69 and 99. Chocks 161 are positioned against the rear wheel of the third car and secured to the floor.

Figure 18:
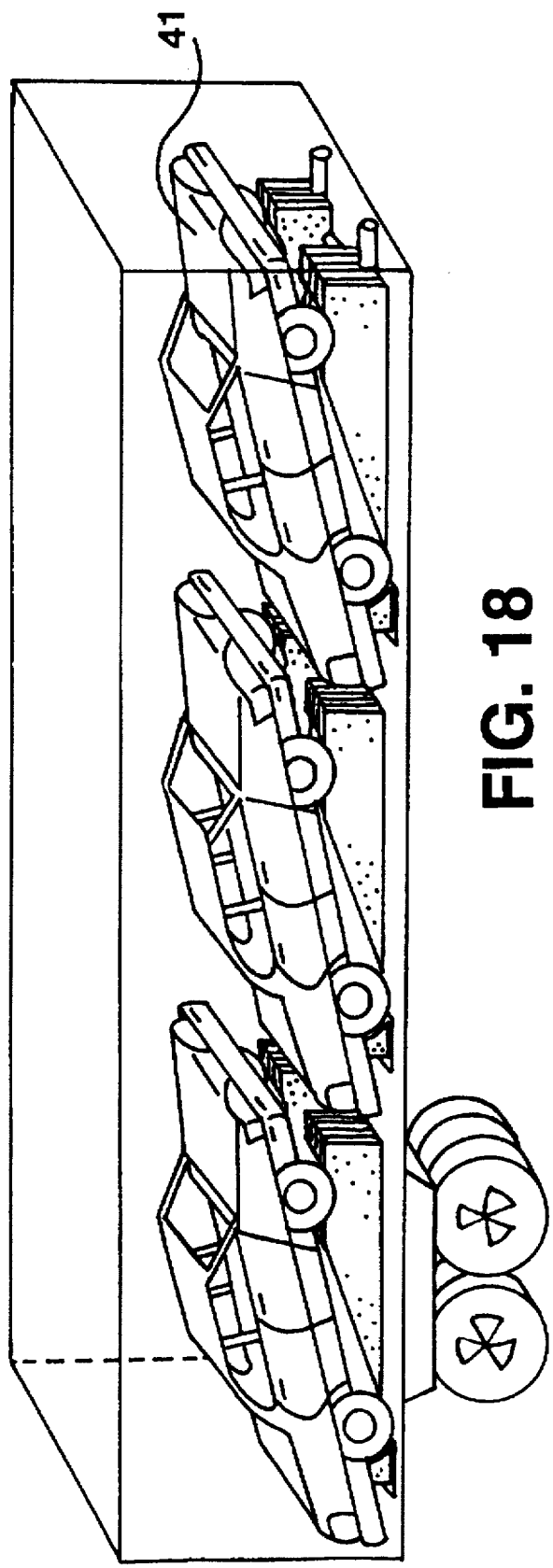
FIG. 18 illustrates three automobiles loaded into a container utilizing the three pairs of ramps of FIGS. 3–17.

FIG. 18 shows three cars loaded in a container with the use of three pairs of ramps 51 and 81. It is to be understood that the ramps may be used to load a different number of cars in a container dependent on its size and the size of the cars. For example, four pairs of the ramps may be used to load four cars in a container.

After the container has been loaded there will exist a multiplicity of voids along the sides of the automobiles and between the interior sides of the container. These voids can be disregarded since the lateral motion of the automobiles is prevented by the inertial friction between the tires on the automobiles, the composite material and the particular design of the semi-circular concave tire depressions in the top planes of the polyhedron wedge ramps in combination with the composite chocks and tie downs.

The overhead void (above the top of the automobile and the interior top side of the container) may also be disregarded since the automobile is held down in place by its own gravitational weight and the limited amount of vertical travel created by the interaction of the springs on the automobile and the springs on the undercarriage of the intermodal trailer.

Backward movement of the loaded automobiles to the rear void (between the rear of the last automobile and the doors of the semi-trailer or container) must be prevented to avoid damage. This is accomplished by affixing the rear wheels of the rear automobile to the floor and the chassis of the rear auto to the side wall of the container by means of wedge chocks, tie downs and appropriate generally accepted dunnage such as air bags, floor tie downs or chocks which can be placed in this rear void to restrict movement of the automobile lading.

Each wedge-shaped ramp member is in the general form of a rectangular hexahedron of appropriate length, width, and thickness elongated along an axis and truncated diagonally by a plane making a small acute angle with the axis and defining a rectangular tractable surface having short sides perpendicular to the axis.

The wedge-shaped ramp members can be constructed of composites of corrugated cardboard, rigid foam, and fiberglass, respectively or in combination. These materials are low density, strong, lightweight, economical and readily available from many geographically dispersed sources.

Composite wedge members constructed of these inexpensive materials can suffer minor damage without being totally disabled. They have physical properties like corrugated cartons in which much cargo is enclosed for its protection and hence, is less likely to damage the cargo or automobiles. If general cargo is shipped and the wedges are not used for automobile loading, they are not likely to cause damage if they come into contact with the general cargo as would a disassembled mechanical device used to load automobiles that is made of hard metal with moving parts. These wedge-shaped ramp embodiments derive their high strength and low density by the manner in which they are constructed in the preferred embodiment which orients the longitudinal die cut laminated sheets of cardboard vertically toward the downward gravitational forces extended by the automobiles through their tires while in contact with the wedge members while in use.

These wedge-shaped ramps can be juxtapositioned and used as dunnage fillers in side, rear or front voids when handling general cargos as an alternate to loading automobiles.

It is preferred to construct the wedge members of solid corrugated cardboard bonded and laminated layer upon layer with the usual intersheets. The material is oriented in such a manner that the length of the corrugation is aligned with the width of the wedge-shaped ramp. The truncated surface is rough (from the sides of many sheets of cardboard rather than the smooth flat surface of one sheet) providing friction and creating traction between the tires of the automobile and the truncated ramp. The preferred acute angle of truncation of the wedge-shaped ramp also allows for counter imposing one ramp upon the other, complementarily when in use as a dunnage filler or stored in the container; or, elsewhere when not in use for loading automobiles as shown in FIG. 21. These embodiments are comprised of materials environmentally recyclable.

These wedges also may be constructed out of fiberglass or foam; or in combination of fiberglass and/or foam and/or corrugated cardboard. As combinations, a cardboard core may be coated or covered with fiberglass or foam. A hollow fiberglass ramp may be filled with foam. This is not a preferred method of construction due to weight, costs, recyclablity and possibility of cargo damage. Other preferred dimensions may also be used, of course, as required for a variety of vehicular sizes weights and shapes of general cargo.

In one embodiment, each of the ramps 51 and 81 may have a length of 7-8 feet, a height of 2 feet and a width of 2 feet. The angle theta may be 18 degrees. It is to be understood that the ramps may have different dimensions.

The spacers 141, 143, 151 and 153 may be formed of wood, PVC pipe or other linear polymers of high molecular weight such as butadiene styrene.

FIGS. 16 and 17 show a process of forming the spacers from corrugated cardboard rolled into a cylinder and cut to the desired lengths with a hand saw 163.

The chocks 161 may be formed of layers laminated corrugated cardboard as shown in FIG. 19 having their base secured to a fiberboard sheet 165 which can be secured to the floor of a container with roofing nails 167. The front 161F of the chock 161 is concave to fit the rear tires of a motor vehicle.

It is to be understood that the ramps may be used to load other types of motor vehicles such as trucks and the motor vehicles may be backed on the ramps in the container rather than driven forward.

The containers may be conventional containers used to transport cargo on trains, boats and by trucks on highways.

I claim:

1. Apparatus for holding two wheels of a motor vehicle in place, comprising:

a pair of wedge shaped ramp members,
 each wedge shaped ramp member comprising:
  a bottom surface,
  first and second opposite facing sides,
  front and rear ends with said member having a given length between said front and rear ends,
  a top surface with at least a portion of said top surface forming an acute angle relative to said bottom surface such that the distance between said portion of said top surface and said bottom surface increases along said length of said member from said rear end for a given distance,
  a slot formed in said top surface between said two sides near said front end for receiving a portion of a tire,
  at least two side apertures extending into said member from one of said sides of said member near said bottom surface,
 said two members being adapted to be located in a vehicle in a supporting position wherein said at least two side apertures of said two members are located to face each other when said bottom surfaces of said two members rest on a support surface and said front ends of said two members face in the same direction,
 two elongated spacers each of which has opposite ends,
 said two elongated spacers being adapted to have their opposite ends located in said side apertures of said two members when said two members are located in said supporting position to space said two members apart,
 wherein two wheels of a vehicle may be partially located in said slots of said two members.

2. The apparatus of claim 1, comprising:

at least one front aperture extending into each of said members from said front ends near said bottom surfaces,
 two front spacers each of which has opposite ends,
 said two front spacers being adapted to have ends located in said front apertures of said two members and ends located against a front surface for spacing said front ends of said two members from the front surface.

3. The apparatus of claim 2, wherein:

each of said wedge shaped ramp members is formed of a plurality of layers of corrugated cardboard laminated together with each layer extending along the lengths of said members.

4. The apparatus of claim 2, wherein:

each of said ramp members comprises fiberglass.

5. The apparatus of claim 2, wherein:

each of said ramp members is formed of a rigid foam.

6. The apparatus of claim 2, comprising:

a container for transporting motor vehicles and having a front wall, a rear wall, two spaced apart side walls, and a bottom wall,
 said two members of said apparatus are located in said supporting position with their bottom surfaces being supported by said bottom wall,
 said two elongated spacers have their opposite ends located in said side apertures of said two members to space said two members apart,
 said two front spacers having ends located in said front apertures of said two members and opposite ends located against said front surface for spacing said front ends of said two members from said front surface, and
 a motor vehicle having two wheels located partially in said slots of said two members.

7. The apparatus of claim 6, wherein said from surface comprises said front wall of said container.

8. A method of supporting a motor vehicle in a container wherein the vehicle comprises two wheels and the container has a front wall, a rear wall, two spaced apart side walls and a bottom wall, comprising the steps of:

providing a pair of wedge shaped ramp members, each wedge shaped ramp member comprising:

a bottom surface, first and second opposite facing sides, front and rear ends with said member having a given length between said front and rear ends, a top surface with at least a portion of said top surface forming an acute angle relative to said bottom surface such that the distance between said portion of said top surface and said bottom surface increases along said length of said member from said rear end for a given distance, a slot formed in said top surface between said two sides near said front end for receiving a portion of a wheel, at least two side apertures extending into said member from one of said sides of said member near said bottom surface, at least one front aperture extending into said member from said front end near said bottom surface, said two members being adapted to be located in a vehicle supporting position wherein, said at least two side apertures of said two members are located to face each other when said bottom surfaces of said two members rest on a support surface and said front ends of said two members face in the same direction, providing at least four elongated spacers each of which has opposite ends, two of said spacers being adapted to have their opposite ends located in said side apertures of said two members when said two members are located in said vehicle supporting position to space said two members apart, two of said spacers being adapted to have ends located in said front apertures of said two members and opposite ends located against a front surface for spacing said front ends of said members from the front surface, locating said two members in said container in said vehicle supporting position with their bottom surfaces being supported by said bottom wall, locating the ends of two of said spacers in said side apertures of said two members to space said two members apart, locating the ends of two of said spacers in said front apertures of said two members and two opposite ends located against a front surface for spacing said front ends of said members from said front surface, and moving said vehicle up said two members and locating said two wheels partially in said slots of said two members.

\* \* \* \* \*